(12) United States Patent
Takagi et al.

(10) Patent No.: US 9,683,189 B2
(45) Date of Patent: Jun. 20, 2017

(54) WATER-SOLUBLE METALWORKING OIL AGENT, METALWORKING FLUID, AND METALWORKING METHOD

(71) Applicant: IDEMITSU KOSAN CO., LTD., Tokyo (JP)

(72) Inventors: Fumiaki Takagi, Chiba (JP); Yoichiro Jido, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 238 days.

(21) Appl. No.: 14/359,209

(22) PCT Filed: Nov. 15, 2012

(86) PCT No.: PCT/JP2012/079665
§ 371 (c)(1),
(2) Date: May 19, 2014

(87) PCT Pub. No.: WO2013/073617
PCT Pub. Date: May 23, 2013

(65) Prior Publication Data
US 2014/0326117 A1    Nov. 6, 2014

(30) Foreign Application Priority Data

Nov. 17, 2011    (JP) .................................. 2011-251925

(51) Int. Cl.
*C10M 173/00*    (2006.01)
*C10M 105/62*    (2006.01)
*B23Q 11/12*    (2006.01)

(52) U.S. Cl.
CPC ......... *C10M 105/62* (2013.01); *B23Q 11/121* (2013.01); *C10M 173/00* (2013.01); *C10M 2207/125* (2013.01); *C10M 2207/126* (2013.01); *C10M 2207/127* (2013.01); *C10M 2207/128* (2013.01); *C10M 2207/28* (2013.01); *C10M 2207/2805* (2013.01); *C10M 2207/2835* (2013.01); *C10M 2209/102* (2013.01); *C10M 2209/104* (2013.01); *C10M 2209/108* (2013.01); *C10M 2209/109* (2013.01); *C10M 2215/04* (2013.01); *C10M 2215/042* (2013.01); *C10M 2215/044* (2013.01); *C10M 2215/0425* (2013.01); *C10M 2215/223* (2013.01); *C10N 2230/06* (2013.01); *C10N 2240/40* (2013.01); *C10N 2240/401* (2013.01); *C10N 2240/406* (2013.01); *C10N 2240/408* (2013.01); *C10N 2240/409* (2013.01); *Y10T 83/0443* (2015.04)

(58) Field of Classification Search
USPC .......................................................... 72/42
See application file for complete search history.

(56) References Cited

U.S. PATENT DOCUMENTS

| | | | | | |
|---|---|---|---|---|---|
| 4,359,393 | A | * | 11/1982 | Sturwold | ............. C10M 173/02 508/505 |
| 6,706,670 | B2 | * | 3/2004 | Kalota | ................. C10M 173/02 508/185 |
| 7,776,799 | B2 | * | 8/2010 | Raison | ................. C10M 171/06 508/150 |

(Continued)

FOREIGN PATENT DOCUMENTS

| | | |
|---|---|---|
| CN | 101970627 A | 2/2011 |
| JP | 57 159891 | 10/1982 |
| JP | 60 141795 | 7/1985 |
| JP | 62 86096 | 4/1987 |
| JP | 10 8077 | 1/1998 |
| JP | 10 85872 | 4/1998 |
| JP | 2000 256695 | 9/2000 |

(Continued)

OTHER PUBLICATIONS

Third Party Submission issued Jul. 14, 2015 in Japanese Patent Application No. 2011-251925.
Combined Office Action and Search Report issued Jun. 2, 2015 in Chinese Patent Application No. 201280056557.6.
U.S. Appl. No. 14/359,194, filed May 19, 2014, Takagi, et al.
International Search Report Issued Feb. 19, 2013 in PCT/JP12/079665 Filed Nov. 15, 2012.

*Primary Examiner* — Ellen McAvoy
(74) *Attorney, Agent, or Firm* — Oblon, McClelland, Maier & Neustadt, L.L.P.

(57) ABSTRACT

The invention provides a water-soluble metal-working oil agent, including a component A, a component B, a component C, and a component D, wherein the component A is an ester compound which has a characteristic temperature, as measured in accordance with JIS K2242, of 570° C. or higher and which is contained in the water-soluble metal-working oil agent in an amount of 10 mass % or more with respect to the entire amount of the agent; the component B is at least one condensed fatty acid which is selected from a condensed fatty acid (1), produced through dehydration condensation of a hydroxycarboxylic acid, and a condensed fatty acid (2), produced through dehydration condensation of an alcoholic hydroxyl group of the condensed fatty acid (1) with a monovalent carboxylic acid, which has a characteristic temperature, as measured in accordance with JIS K2242, of 650° C. or higher, and which is contained in the water-soluble metal-working oil agent in an amount of 7.5 mass % or more with respect to the entire amount of the agent; the component C is a carboxylic acid which is contained in the water-soluble metal-working oil agent in an amount of 2 mass % or more with respect to the entire amount of the agent; and the component D is a basic compound contained in such a neutralization equivalent that at least the component B and component C are neutralized to cancel out the sum of the acid values thereof. The agent can provide excellent workability with a hard-to-work material and can prolong tool life.

17 Claims, No Drawings

(56) References Cited

U.S. PATENT DOCUMENTS

| | | | | |
|---|---|---|---|---|
| 8,168,575 | B2 * | 5/2012 | Brutto | C10M 173/00 508/449 |
| 8,476,208 | B2 * | 7/2013 | Kadokawa | A01N 33/04 508/558 |
| 9,029,306 | B2 * | 5/2015 | Takagi | C10M 173/00 508/455 |
| 2008/0171680 | A1 * | 7/2008 | Kim | C10M 109/00 508/491 |
| 2012/0177938 | A1 * | 7/2012 | Goto | C10M 169/04 428/544 |
| 2012/0184475 | A1 | 7/2012 | Takagi et al. | |
| 2014/0128299 | A1 * | 5/2014 | Zhao | C10M 173/02 508/280 |
| 2015/0064741 | A1 * | 3/2015 | Gibbons | C10M 135/36 435/34 |

FOREIGN PATENT DOCUMENTS

| | | |
|---|---|---|
| JP | 2002 146380 | 5/2002 |
| JP | 2004 256771 | 9/2004 |
| JP | 2011-79956 A | 4/2011 |
| JP | 2011 111593 | 6/2011 |
| WO | WO 2011/065355 A1 | 6/2011 |

* cited by examiner

WATER-SOLUBLE METALWORKING OIL AGENT, METALWORKING FLUID, AND METALWORKING METHOD

TECHNICAL FIELD

The present invention relates to a water-soluble metalworking oil agent, for use in metal working; i.e., cutting or grinding of metal pieces, to a metal-working liquid, and to a metal-working method.

BACKGROUND ART

In metal machining processes such as cutting and grinding, a metal-working oil agent is used for improving machining efficiency, for preventing abrasion between a workpiece and a tool for machining the workpiece, for prolonging tool life, for removing metal chips, and for other purposes. Such metal metal-working oil agents include an oil-base agent predominantly containing an oil component such as mineral oil, animal and vegetable oil, or synthetic oil, and a water-soluble agent containing an oil component and a surface active compound. From the viewpoints of effective utilization of resources and fire prevention, a water-solubility-imparted agent (i.e., a water-soluble metal-working oil agent) has come to be used more and more in recent years.

In order to satisfy defoaming property and rotting resistance which are essential properties of the water-soluble metal-working oil agent and also to enhance machining efficiency, one proposed solution is incorporation of a compound, such as risinoleic acid polymer amine salt, into a metal-working oil agent (see Patent Document 1). Conventionally, chlorinated paraffin has been incorporated into a metal-working oil agent for the purpose of enhancing machining efficiency. However, since such a halohydrocarbon possibly generates dioxin, which is harmful to the human body, in recent years, a compound such as a sulfur compound or a phosphorus compound is used instead of chlorinated paraffin (see Patent Document 2). Furthermore, in order to attain further enhanced workability, there has been proposed incorporation, into a metal-working oil agent, of a compound such as a condensed risinoleic fatty acid, an ester compound, or an amine (see Patent Document 3).

However, as disclosed in Patent Documents 1 and 3, even in the case of a metal-working oil agent composed of a mixture of a risinoleic acid polycondensation product amine salt and a mineral oil, when a material which is difficult to work; i.e., hard-to-work material, such as titanium alloy, nickel alloy, or cobalt alloy, is subjected to cutting work, the heat generated during the working accumulates in a tool, and such an increased heat load causes problems, including shortening of tool life.

In another case where cutting speed is elevated to enhance productivity, higher heat is generated, and the heat imposes a further load on the tool. Thus, even in the case disclosed in Patent Document 3, where a risinoleic-acid-polycondensed fatty acid and an ester compound are used in combination, sufficient workability may fail to be attained. In the case disclosed in Patent Document 2, use of a sulfur compound or a phosphorus compound may impose a load on the environment.

Therefore, in machining hard-to-work materials, there is demand for further improvement of a metal-working oil agent.

PRIOR ART DOCUMENTS

Patent Documents

Patent Document 1: Japanese Patent Application Laid-Open (kokai) No. Sho 57-159891
Patent Document 2: Japanese Patent Application Laid-Open (kokai) No. Sho 60-141795
Patent Document 3: Japanese Patent Application Laid-Open (kokai) No. 2011-111593

SUMMARY OF THE INVENTION

Problems to be Solved by the Invention

Thus, an object of the present invention is to provide a water-soluble metal-working oil agent, a metal-working liquid, and a metal-working method, which attain excellent workability with a hard-to-work material and which can prolong tool life.

Means for Solving the Problems

The present inventors have conducted extensive studies, and have found that the above object can be attained by selectively incorporating, into a water-soluble metal-working oil agent, as lubrication components, an ester compound having a characteristic temperature meeting a specific condition, and a specific condensed fatty acid. The present invention has been accomplished on the basis of this finding.

Accordingly, the present invention is directed to the following:

[1] A water-soluble metal-working oil agent, characterized by comprising a component A, a component B, a component C, and a component D, wherein:

the component A is an ester compound which has a characteristic temperature, as measured in accordance with JIS K2242, of 570° C. or higher and which is contained in the water-soluble metal-working oil agent in an amount of 10 mass % or more with respect to the entire amount of the agent;

the component B is at least one condensed fatty acid which is selected from a condensed fatty acid (1), produced through dehydration condensation of a hydroxycarboxylic acid, and a condensed fatty acid (2), produced through dehydration condensation of an alcoholic hydroxyl group of the condensed fatty acid (1) with a monovalent carboxylic acid, which has a characteristic temperature, as measured in accordance with JIS K2242, of 650° C. or higher, and which is contained in the water-soluble metal-working oil agent in an amount of 7.5 mass % or more with respect to the entire amount of the agent;

the component C is a carboxylic acid which is contained in the water-soluble metal-working oil agent in an amount of 2 mass % or more with respect to the entire amount of the agent; and the component D is a basic compound contained in such a neutralization equivalent that at least the component B and component C are neutralized to cancel out the sum of the acid values thereof.

[2] A metal-working liquid comprising the water-soluble metal-working oil agent diluted by water.

[3] A metal-working method comprising working a metal workpiece by use of the water-soluble metal-working oil agent.

[4] A metal-working method comprising working a metal workpiece by use of the metal-working liquid.

Effects of the Invention

The present invention enables provision of a water-soluble metal-working oil agent, a metal-working liquid, and a metal-working method, which attain excellent workability with a hard-to-work material and which can prolong tool life.

MODES FOR CARRYING OUT THE INVENTION

The present invention will next be described in detail.
[Water-Soluble Metal-Working Oil Agent]
An embodiment of the water-soluble metal-working oil agent includes a component A, a component B, a component C, and a component D. The component A is an ester compound which has a characteristic temperature, as measured in accordance with JIS K2242, of 570° C. or higher and which is contained in the water-soluble metal-working oil agent in an amount of 10 mass % or more with respect to the entire amount of the agent. The component B is at least one condensed fatty acid which is selected from a condensed fatty acid (1), produced through dehydration condensation of a hydroxycarboxylic acid, and a condensed fatty acid (2), produced through dehydration condensation of an alcoholic hydroxyl group of the condensed fatty acid (1) with a monovalent carboxylic acid, which has a characteristic temperature, as measured in accordance with JIS K2242, of 650° C. or higher, and which is contained in the water-soluble metal-working oil agent in an amount of 7.5 mass % or more with respect to the entire amount of the agent. The component C is a carboxylic acid which is contained in the water-soluble metal-working oil agent in an amount of 2 mass % or more with respect to the entire amount of the agent. The component D is a basic compound contained in such a neutralization equivalent that at least the component B and component C are neutralized to cancel out the sum of the acid values thereof.

In the embodiment of the present invention, the term "water-soluble metal-working oil agent" refers to a cutting oil agent having water solubility that allows the agent to be diluted with water upon use of metal working. As used herein, the water-soluble metal-working oil agent refers to that in an undiluted state.

According to JIS K2242 (heat-treating oil quench test (method A)), the cooling process of a silver test probe is defined as a vapor step, a boiling step, and a convection step. The characteristic temperature refers to a temperature of transition from the vapor step to the boiling step.

More specifically, in the vapor step, the surface temperature of the heated test probe is high, and the test probe is covered with a vapor layer of the corresponding oil agent. That is, in the vapor step, the oil agent cannot come into direct contact with the test probe as a liquid. In other words, at a temperature equal to or higher than the characteristic temperature, the oil agent cannot act on the test probe as a liquid, and encounters difficulty in imparting lubricity to the test probe.

The boiling step corresponds to a state in which the oil agent comes into contact with the test probe after breakage of the vapor film, resulting in nuclear boiling. That is, in the boiling step, the oil agent can come into direct contact with the test probe as a liquid. In other words, at a temperature equal to or lower than the characteristic temperature, the oil agent can act on the test probe as a liquid, to thereby impart lubricity to the test probe.

<Component A>

The component A is an ester compound having a characteristic temperature, as measured in accordance with JIS K2242, of 570° C. or higher. When the component A has a characteristic temperature lower than 570° C., an oil component involved in lubrication is readily vaporized, and a sufficient abrasion-reducing effect fails to be attained, resulting in shortened tool life. The characteristic temperature is preferably 600° C. or higher, more preferably 650° C. or higher. No particular limitation is imposed on the upper limit of the characteristic temperature, but it is preferably 800° C. or lower.

Examples of the carboxylic acid forming the ester compound include caproic acid, enanthic acid, caprylic acid, 2-ethylhexanoic acid, pelargonic acid, isononanoic acid, capric acid, neodecanoic acid, lauric acid, myristic acid, palmitic acid, stearic acid, arachidic acid, behenic acid, lignoceric acid, undecylenic acid, oleic acid, elaidic acid, erucic acid, nervonic acid, linoleic acid, γ-linolenic acid, arachidonic acid, α-linolenic acid, stearidonic acid, eicosapentaenoic acid, docosahexanenoic acid, adipic acid, suberic acid, sebacic acid, azelaic acid, dodecandioic acid, and citric acid.

Examples of the alcohol forming the ester compound include pentaerythritol, neopentyl glycol, and trimethylolpropane.

The ester compound is preferably a polyol ester prepared from a polyhydric alcohol. A ester compound produced from pentaerythritol and a carboxylic acid is preferred.

The component A is preferably contained in an amount of 10 mass % or more with respect to the entire amount of the water-soluble metal-working oil agent, more preferably 15 mass % or more. When the component A content is 10 mass % or more, tool life can be sufficiently prolonged.

<Component B>

The component A is preferably contained in an amount of 10 mass % or more with respect to the entire amount of the water-soluble metal-working oil agent, more preferably 15 mass % or more. When the component A content is 10 mass % or more, tool life can be sufficiently prolonged.

The component B is at least one condensed fatty acid which is selected from a condensed fatty acid (1), produced through dehydration condensation of a hydroxycarboxylic acid, and a condensed fatty acid (2), produced through dehydration condensation of an alcoholic hydroxyl group of the condensed fatty acid (1) with a monovalent carboxylic acid, and has a characteristic temperature, as measured in accordance with JIS K2242, of 650° C. or higher.

When the characteristic temperature of the component B is lower than 650° C., the component B is readily vaporized, and a sufficient abrasion-reducing effect fails to be attained, resulting in shortened tool life. From these viewpoints, the characteristic temperature of the component B is preferably 670° C. or higher, more preferably 690° C. or higher.

An example of the hydroxycarboxylic acid for use in production of the component B having a characteristic temperature, as measured in accordance with JIS K2242, of 650° C. or higher is ricinoleic acid. The hydroxycarboxylic acid can be produced through dehydration polycondensation of ricinoleic acid (12-hydroxyoctadeca-9-enonic acid). When ricinoleic acid heated to about 200° C. in an inert atmosphere, dehydration polycondensation initiates, to thereby yield a polycondensed fatty acid.

The ricinoleic acid polymerization degree is controlled by reaction time. The longer the reaction time, the lower the acid value and hydroxyl value. Thus, a fatty acid having a high polycondensation degree can be produced. The higher the polycondensation degree, the higher the characteristic temperature of the produced polycondensed fatty acid.

The condensed fatty acid (2) is produced by carrying out dehydration polycondensation of a dehydration polycondensation product of a hydroxycarboxylic acid with an additional monovalent carboxylic acid. Progress of this reaction can be confirmed by a drop in hydroxyl value. As a result of this reaction, a polycondensed fatty acid having a higher characteristic temperature can be produced.

The monovalent carboxylic acid used in the reaction may be a saturated or unsaturated carboxylic acid. However, a C≥4 carboxylic acid is preferred, since a malodor and metal corrosion may be induced by an unreacted carboxylic acid having a few carbon atoms remaining in the reaction system. Examples of the saturated carboxylic acid include caproic acid, enanthic acid, caprylic acid, 2-ethylhexanoic acid, pelargonic acid, isononanoic acid, capric acid, neodecanoic acid, lauric acid, myristic acid, palmitic acid, stearic acid, arachidic acid, behenic acid, and lignoceric acid. Examples of the unsaturated carboxylic acid include undecylenic acid, oleic acid, elaidic acid, erucic acid, nervonic acid, linoleic acid, γ-linolenic acid, arachidonic acid, α-linolenic acid, stearidonic acid, eicosapentaenoic acid, and docosahexanenoic acid.

The component B preferably has an acid value of 60 mgKOH/g or less, more preferably 40 mgKOH/g or less. When the acid value of the component B is in excess of 60 mgKOH/g, a target characteristic temperature cannot be attained, and sufficient workability may fail to be attained.

The component B preferably has a hydroxyl value of 50 mgKOH/g or less, more preferably 35 mgKOH/g or less. When the hydroxyl value of the component B in excess of 50 mgKOH/g, a target characteristic temperature cannot be attained, and sufficient workability may fail to be attained.

The component B is preferably contained in an amount of 7.5 mass % or more with respect to the entire amount of the water-soluble metal-working oil agent, more preferably in an amount of 10 mass % or more. When the component B content is 7.5 mass % or more, a sufficient abrasion-reducing effect can be attained, thereby prolonging tool life.

Notably, the acid value is determined in accordance with JIS K2501; the hydroxyl value is determined in accordance with JIS K0070; and a saponification value is determined in accordance with JIS K2503.

<Component C>

The water-soluble metal-working oil agent preferably contains a carboxylic acid serving as the component C. The carboxylic acid which may be used as the component C may be a unsaturated carboxylic acid or a saturated carboxylic acid and may have a linear-chain structure or a cyclic structure. The component C is preferably a C4 to C30 monovalent carboxylic acid, divalent carboxylic acid, or polyvalent carboxylic acid.

The same monovalent carboxylic acid as employed in production of the component B may be employed as the component C.

Examples of the divalent carboxylic acid include adipic acid, suberic acid, sebacic acid, azelaic acid, and dodecandioic acid. Examples of the polyvalent carboxylic acid include citric acid.

The carboxylic acid serving as the component C is contained in an amount of 2 mass % or more with respect to the entire amount of the water-soluble metal-working oil agent, preferably in an amount of 5 mass % or more, more preferably in an amount of 8 mass % or more. When the component B content is less than 2 mass %, stability of the water-soluble metal-working oil agent and its diluted product may fail to be fully attained.

<Component D>

The water-soluble metal-working oil agent preferably contains an amine compound or an alkali metal compound serving as the component D. From the viewpoint of stability of the water-soluble metal-working oil agent, the component D is preferably contained in such a neutralization equivalent that at least the component B and component C are neutralized to cancel out the sum of the acid values thereof. The upper limit of the component D content is such an amount that a 10 vol. % water-diluted product of the water-soluble metal-working oil agent has a pH of 11. When the component D content is less than the neutralization equivalent, the water-soluble metal-working oil agent has poor stability. When the diluted liquid has a pH in excess of 11, workers involved in metal working may suffer rough hands.

The amine compound which may be used as the component D may be a primary amine, a secondary amine, a tertiary amine, or an alkanolamine.

Examples of the primary amine include monoethanolamine, monopropanolamine, monoisopropanolamine, 2-amino-1-butanol, 2-amino-2-methylpropanol, butylamine, pentylamine, hexylamine, cyclohexylamine, octylamine, laurylamine, stearylamine, oleylamine, and benzylamine.

Examples of the secondary amine include diethylamine, diisopropylamine, dibutylamine, dipentylamine, dihexylamine, dicyclohexylamine, dioctylamine, dilaurylamine, distearylamine, dioleylamine, dibenzylamine, diethanolamine, piperazine, diisopropanolamine, stearylethanolamine, decylethanolamine, hexylpropanolamine, benzylethanolamine, phenylethanolamine, and tolylpropanolamine.

Examples of the tertiary amine include tributylamine, tripentylamine, trihexylamine, tricyclohexylamine, trioctylamine, trilaurylamine, tristearylamine, trioleylamine, tribenzylamine, methyldicyclohexylamine, dioleyletha-nolamine, dilaurylpropanolamine, dioctylethanolamine, dibutylethanolamine, diethylethanolamine, dimethylethanolamine, dihexylpropanolamine, dibutylpropanolamine, oleyldiethanolamine, stearyldipropanolamine, lauryldiethanolamine, octyldipropanolamine, butyldiethanolamine, methyldiethanolamine, cyclohexyldiethanolamine, benzyldiethanolamine, phenyldiethanolamine, tolyldipropanolamine, xylyldiethanolamine, triethanolamine, tripropanolamine, and triisopropanolamine.

These amine compounds form amine salts with a carboxylic acid serving as the component C. When the water-soluble metal-working oil agent contains an amine compound, the stability of the water-soluble metal-working oil agent is ensured, and water solubility thereof can be improved. From the viewpoints of emulsion stability, anticorrosiveness, and rotting resistance, the amine compound used in the invention is preferably an alkanolamine and/or an alkylamine.

Notably, base value (hydrochloric acid method) is determined in accordance with JIS K2501.

<Water>

The water-soluble metal-working oil agent (undiluted liquid composition) may contain a certain amount of water. From the viewpoint of water solubility, the amount of water with respect to the entire amount of the water-soluble metal-working oil agent is preferably 0 to 50 mass %, more preferably 3 to 45 mass %, still more preferably 6 to 40 mass %.

<Other Additional Components>

The water-soluble metal-working oil agent may further contain other components, so long as the effects of the present invention are not impaired. Examples of such additional components include a surfactant, a lubricity improver, a metal deactivator, a defoaming agent, an antiseptic, and an anti-oxidant.

Examples of the surfactant include an anionic surfactant, a cationic surfactant, a nonionic surfactant, and an amphoteric surfactant. Examples of the anionic surfactant include alkylbenzenesulfonate salts and α-olefinsulfonate salts. Examples of the cationic surfactant include quaternary ammonium salts such as alkyltrimethylammonium salts, dialkyldimethylammonium salts, and alkyldimethylbenzylammonium salts. Examples of the nonionic surfactant include ethers such as polyoxyethylene alkyl ether and polyoxyethylene alkylphenyl ether; esters such as sorbitan fatty acid ester, polyoxyethylene sorbitan fatty acid ester, and polyoxyethylene fatty acid ester; and amides such as fatty acid alkanolamide. Examples of the amphoteric surfactant include betains such as alkylbetain.

Examples of the lubricity improver include organic acids. Specific examples of such organic acids include caprylic acid, pelargonic acid, isononanoic acid, capric acid, lauric acid, stearic acid, oleic acid, benzoic acid, p-tert-butylbenzoic acid, adipic acid, suberic acid, sebacic acid, azelaic acid, and dodecandioic acid.

Examples of the metal deactivator include benzotriazole, imidazoline, primidine derivatives, and thiadiazole.

Examples of the anti-oxidant include amine-type antioxidants such as alkylated diphenylamine, phenyl-α-naphthylamine, and alkylated phenyl-α-naphthylamine; phenol-type anti-oxidants such as 2,6-di-t-butylphenol, 4,4'-methylenebis(2,6-di-t-butylphenol), isooctyl-3-(3,5-di-t-butyl-4-hydroxyphenyl)propionate, and n-octadecyl-3-(3,5-di-t-butyl-4-hydroxyphenyl)propionate; sulfur-type anti-oxidants such as dilauryl-3,3'-thiodipropionate; phosphorus-type antioxidants such as phosphite; and molybdenum-type antioxidants.

Examples of the antiseptic include a triazine-based antiseptic and an alkylbenzimidazole-based antiseptic.

Examples of the defoaming agent include methylsilicone oil, fluorosilicone oil, and polyacrylate.

[Metal-Working Liquid]

The metal-working liquid of the present invention is produced by diluting the water-soluble metal-working oil agent (undiluted liquid composition) with water. No particular limitation is imposed on the water, and any of distilled water, ion-exchange water, and tap water may be employed. The water-soluble metal-working oil agent concentration of the diluted product is preferably 3 vol. % to 20 vol. %, more preferably 5 vol. % or higher, still more preferably 10 vol. % or higher. When the diluted product has an oil agent concentration lower than 3 vol. %, sufficient workability may fail to be attained, whereas when the concentration is in excess of 20 vol. %, stability of the diluted product may be impaired.

[Metal-Working Method]

The metal-working method of the present invention includes working a metal workpiece by use of the water-soluble metal-working oil agent (undiluted liquid composition) or the metal-working liquid formed of the water-soluble metal-working oil agent diluted by water. Examples of the metal working process to which the method of the invention may be applied include various metal machining processes such as cutting, grinding, punching, polishing, deep drawing, drawing, and rolling. The metal-working agent of the present invention, providing excellent lubricity, is suitable for machining a so-called hard-to-work material.

The metal forming the workpiece includes a pure metal composed of a single metal element, a mixture of a plurality of metal elements, and a mixture of a metal element and a non-metallic element. The hard-to-work material is at least one species selected from the group consisting of titanium, titanium alloy, nickel alloy, niobium alloy, tantalum alloy, molybdenum alloy, tungsten alloy, stainless steel, and high-manganese steel.

According to the metal-working method of the present invention, a metal working agent which does not contain a compound containing chlorine, sulfur, or phosphorus can be suitably used in intermittent cutting, such as end milling, of a hard-to-work material.

EXAMPLES

The present invention will next be described in more detail by way of examples, which should not be construed as limiting the invention thereto. Characteristics of samples of the water-soluble metal-working oil agent according to the Examples and Comparative Examples were evaluated through the following methods.

[Evaluation Methods]

<Evaluation of Stability of Undiluted Liquid>

The stability of undiluted liquid samples of the water-soluble metal-working oil agent (undiluted liquid composition) was evaluated. Specifically, each of the water-soluble metal-working oil agents obtained in the Examples and Comparative Examples was allowed to stand at 25° C. for 24 hours, and phase separation was checked. A sample in which no separation was observed is rated as "O,", and a sample in which separation was observed is rated as "X."

<Cutting Performance Evaluation>

Cutting performance was evaluated by tool life. Firstly, a workpiece was subjected to end milling by means of an upright machining center under the following conditions. Tool life is defined as the shorter of two periods: a period of time from start of cutting to the point in time when the abrasion of the flank exceeded 0.2 mm, and a period of time from start of cutting to the point in time when the tool was damaged. Each water-soluble metal-working oil agent (undiluted liquid composition) was diluted with water, to thereby prepare a 10 vol. % metal-working liquid, which was employed in cutting performance evaluation.

Facility: upright machining center NV 5000α1/A40, Moroseiki

Work piece: Ti-6AL-4V, φ150×30 mm, disk shape

Insert: XOMX 090308 TR-ME06, F40M (type S30), product of SECO TOOLS

Cutter: Helical Micro Turbo R217.69-2020.3-016-09.2, product of SECO TOOLS

Holder: HSK63A milling chuck CT20A, product of NT Tool

Cutting speed: 80 m/min, 55 m/min

Cut-out: ap (tool axial direction): 2 mm, ae (tool radial direction): 16 mm

Feed: 0.1 mm/tooth

Oil feed: external feed, 3.7 L/min

Dilution: 10 vol. % (dilution by water)

[Component A]

Characteristics of the ester compounds employed as the component A are as follows.

<Ester 1 (Component A1)>

Pentaerythritol Tetraoleate

Characteristic temperature: 704° C., kinematic viscosity (40° C.): 65 mm$^2$/s

The characteristic temperature was determined in accordance with JIS K2242, heat-treating oil quench test (method A). The kinematic viscosity was determined in accordance with JIS K2283.

<Ester 2 (Component A2)>
Trimethylolpropane Trioleate
  Characteristic temperature: 679° C., kinematic viscosity (40° C.): 49 mm²/s
<Ester 3 (Component A3)>
Trimethylolpropane Diisostearate
  Characteristic temperature: 643° C., kinematic viscosity (40° C.): 107 mm²/s
<Ester 4 (Component A4)>
Pentaerythritol Octylate
  Characteristic temperature: 558° C., kinematic viscosity (40° C.): 34 mm²/s
<Ester 5 (Component A5)>
Trimethylolpropane Triester (Ester of Trimethylolpropane with C8 to C10 Carboxylic Acid)
  Characteristic temperature: 534° C., kinematic viscosity (40° C.): 19 mm²/s

[Component B]
<Condensed Fatty Acid 1 (Component B1)>
Ricinoleic acid was subjected to heat dehydration-condensation at 200° C. under a flow of nitrogen, to thereby yield condensed fatty acid 1. The condensed fatty acid 1 had a characteristic temperature of 712° C., an acid value: 34 mgKOH/g, a hydroxyl value of 28 mgKOH/g, and a saponification value of 198 mgKOH/g.

The acid value was determined in accordance with JIS K2501. The hydroxyl value was determined in accordance with JIS K0070. The saponification value was determined in accordance with JIS K2503.

<Condensed Fatty Acid 2 (Component B2)>
Ricinoleic acid was subjected to heat dehydration-condensation at 200° C. under a flow of nitrogen, to thereby yield condensed fatty acid 2. The condensed fatty acid 2 had a characteristic temperature: 680° C., an acid value: 53 mgKOH/g, a hydroxyl value: 42 mgKOH/g, and a saponification value: 196 mgKOH/g.

<Condensed Fatty Acid 3 (Component B3)>
Ricinoleic acid was subjected to heat dehydration-condensation at 200° C. under a flow of nitrogen, and the product was further subjected to heat dehydration-condensation with oleic acid, to thereby yield condensed fatty acid 3. The condensed fatty acid 3 had a characteristic temperature of 666° C., an acid value of 55 mgKOH/g, a hydroxyl value of 9 mgKOH/g, and a saponification value of 201 mgKOH/g.

<Condensed Fatty Acid 4 (Component B4)>
Ricinoleic acid was subjected to heat dehydration-condensation at 200° C. under a flow of nitrogen, and the product was further subjected to heat dehydration-condensation with oleic acid, to thereby yield condensed fatty acid 4. The condensed fatty acid 4 had a characteristic temperature of 628° C., an acid value of 85 mgKOH/g, a hydroxyl value of 15 mgKOH/g, and a saponification value of 195 mgKOH/g.

[Component C]
<Carboxylic Acid 1 Component C1>
  Oleic acid, acid value: 198 mgKOH/g
<Carboxylic Acid 2 Component C2>
  Neodecanoic acid, acid value: 321 mgKOH/g
<Carboxylic Acid 3 Component C3>
  Sebacic acid, acid value: 554 mgKOH/g

[Component D]
<Amine 1 (Component D1)>
  Monoisopropanolamine, base value: 747 mgKOH/g
<Amine 2 (Component D2)>
  Methyldicyclohexylamine, base value: 284 mgKOH/g The base value (hydrochloric acid method) was determined in accordance with JIS K2501.

Examples and Comparative Examples

According to the formulations shown in Table 1, components were mixed to prepare water-soluble metal-working oil agents. The water-soluble metal-working oil agents produced in Examples 1 to 9, and those produced in Comparative Examples 1 to 6 were evaluated through the aforementioned methods. Table 1 shows the results.

TABLE 1

| | | | | | | Charact. temp. (° C.) | Acid value (mgKOH/g) | OH value (mgKOH/g) | Base value (mgKOH/g) | Examples 1 | 2 | 3 | 4 | 5 | 6 |
|---|---|---|---|---|---|---|---|---|---|---|---|---|---|---|---|
| Components (parts by mass) | Water-soluble metal-working oil agent | A | Ester 1 | A1 | | 705 | — | — | — | 20.0 | 20.0 | 54.0 | — | — | — |
| | | | Ester 2 | A2 | | 679 | — | — | — | — | — | — | 20.0 | — | — |
| | | | Ester 3 | A3 | | 643 | — | — | — | — | — | — | — | 20.0 | 20.0 |
| | | | Ester 4 | A4 | | 558 | — | — | — | — | — | — | — | — | — |
| | | | Ester 5 | A5 | | 534 | — | — | — | — | — | — | — | — | — |
| | | B | C. fatty acid 1 | B1 | | 712 | 34 | 28 | — | 15.0 | 15.0 | 10.0 | 15.0 | 15.0 | 15.0 |
| | | | C. fatty acid 2 | B2 | | 680 | 53 | 42 | — | — | — | — | — | — | — |
| | | | C. fatty acid 3 | B3 | | 666 | 55 | 9 | — | — | — | — | — | — | — |
| | | | C. fatty acid 4 | B4 | | 628 | 85 | 15 | — | — | — | — | — | — | — |
| | | C | Carboxylic acid 1 | C1 | | — | 198 | — | — | 3.0 | 3.0 | 7.0 | 3.0 | 3.0 | 3.0 |
| | | | Carboxylic acid 2 | C2 | | — | 321 | — | — | 6.5 | 6.5 | — | 6.5 | 6.5 | 6.5 |
| | | | Carboxylic acid 3 | C3 | | — | 554 | — | — | 3.5 | 3.5 | 3.0 | 3.5 | 3.5 | 3.5 |
| | | D | Amine 1 | D1 | | — | — | — | 747 | 11.0 | 11.0 | 5.0 | 11.0 | 11.0 | 11.0 |
| | | | Amine 2 | D2 | | — | — | — | 284 | 6.5 | 6.5 | 9.0 | 6.5 | 6.5 | 6.5 |
| | | Benzotriazole | | | | | | | | 1.0 | 1.0 | 1.0 | 1.0 | 1.0 | 1.0 |
| | | Polyoxyethylene monoalkyl ether | | | | | | | | 2.0 | 2.0 | — | 2.0 | 2.0 | 2.0 |
| | | Polyoxyethylene sorbitan monooleate | | | | | | | | — | — | 3.0 | — | — | — |
| | | Water | | | | | | | | 31.5 | 31.5 | 8.0 | 31.5 | 31.5 | 31.5 |
| Acid value (component B + component C) | | | | | | | | | | 51 | 51 | 34 | 51 | 51 | 51 |
| Base value (component D) | | | | | | | | | | 101 | 101 | 63 | 101 | 101 | 101 |
| Test conditions | Cutting speed | | 55 (m/min) | | | | | | | — | ○ | — | — | — | ○ |
| | | | 80 (m/min) | | | | | | | ○ | — | ○ | ○ | ○ | — |
| Evaluation | Undiluted liquid stability | | | | | | | | | ○ | ○ | ○ | ○ | ○ | ○ |

TABLE 1-continued

| | | | | | | | | | | | | | |
|---|---|---|---|---|---|---|---|---|---|---|---|---|---|
| results | | | Tool life (min) | | | | | | 24.3 | >50.0 | 28.4 | 20.3 | 16.2 >50.0 |

| | | | | | | Charact. temp. ($°$ C.) | Acid value (mgKOH/g) | OH value (mgKOH/g) | Base value (mgKOH/g) | Examples | | |
|---|---|---|---|---|---|---|---|---|---|---|---|---|
| | | | | | | | | | | 7 | 8 | 9 |
| Components (parts by mass) | Water-soluble metal-working oil agent | A | Ester 1 | A1 | | 705 | — | — | — | 15.0 | 20.0 | — |
| | | | Ester 2 | A2 | | 679 | — | — | — | — | — | 20.0 |
| | | | Ester 3 | A3 | | 643 | — | — | — | — | — | — |
| | | | Ester 4 | A4 | | 558 | — | — | — | — | — | — |
| | | | Ester 5 | A5 | | 534 | — | — | — | — | — | — |
| | | B | C. fatty acid 1 | B1 | | 712 | 34 | 28 | — | — | — | — |
| | | | C. fatty acid 2 | B2 | | 680 | 53 | 42 | — | 25.0 | — | 17.0 |
| | | | C. fatty acid 3 | B3 | | 666 | 55 | 9 | — | — | 15.0 | — |
| | | | C. fatty acid 4 | B4 | | 628 | 85 | 15 | — | — | — | — |
| | | C | Carboxylic acid 1 | C1 | | — | 198 | — | — | 10.0 | 3.0 | 4.0 |
| | | | Carboxylic acid 2 | C2 | | — | 321 | — | — | 6.5 | 6.5 | 6.5 |
| | | | Carboxylic acid 3 | C3 | | — | 554 | — | — | 3.5 | 3.5 | 3.5 |
| | | D | Amine 1 | D1 | | — | — | — | 747 | 11.0 | 11.0 | 11.0 |
| | | | Amine 2 | D2 | | — | — | — | 284 | 6.5 | 6.5 | 6.5 |
| | | | Benzotriazole | | | | | | | 1.0 | 1.0 | 1.0 |
| | | | Polyoxyethylene monoalkyl ether | | | | | | | 2.0 | 2.0 | 2.0 |
| | | | Polyoxyethylene sorbitan monooleate | | | | | | | — | — | — |
| | | | Water | | | | | | | 19.5 | 31.5 | 28.5 |
| Acid value (component B + component C) | | | | | | | | | | 73 | 54 | 57 |
| Base value (component D) | | | | | | | | | | 101 | 101 | 101 |
| Test conditions | Cutting speed | | | 55 (m/min) | | | | | | — | — | — |
| | | | | 80 (m/min) | | | | | | ○ | ○ | ○ |
| Evaluation results | Undiluted liquid stability | | | | | | | | | ○ | ○ | ○ |
| | Tool life (min) | | | | | | | | | 18.3 | 16.2 | 16.2 |

| | | | | | | Charact. temp. ($°$ C.) | Acid value (mgKOH/g) | OH value (mgKOH/g) | Base value (mgKOH/g) | Comparative Examples | | | | | |
|---|---|---|---|---|---|---|---|---|---|---|---|---|---|---|---|
| | | | | | | | | | | 1 | 2 | 3 | 4 | 5 | 6 |
| Components (parts by mass) | Water-soluble metal-working oil agent | A | Ester 1 | A1 | | 705 | — | — | — | — | — | 20.0 | — | — | — |
| | | | Ester 2 | A2 | | 679 | — | — | — | — | — | — | 20.0 | — | — |
| | | | Ester 3 | A3 | | 643 | — | — | — | — | — | — | — | — | — |
| | | | Ester 4 | A4 | | 558 | — | — | — | 20.0 | — | — | — | 20.0 | 20.0 |
| | | | Ester 5 | A5 | | 534 | — | — | — | — | 20.0 | — | — | — | — |
| | | B | C. fatty acid 1 | B1 | | 712 | 34 | 28 | — | 15.0 | 15.0 | — | — | — | — |
| | | | C. fatty acid 2 | B2 | | 680 | 53 | 42 | — | — | — | — | — | — | — |
| | | | C. fatty acid 3 | B3 | | 666 | 55 | 9 | — | — | — | — | — | — | — |
| | | | C. fatty acid 4 | B4 | | 628 | 85 | 15 | — | — | — | 20.0 | 17.0 | 15.0 | 15.0 |
| | | C | Carboxylic acid 1 | C1 | | — | 198 | — | — | 3.0 | 3.0 | 8.0 | 6.0 | 3.0 | 3.0 |
| | | | Carboxylic acid 2 | C2 | | — | 321 | — | — | 6.5 | 6.5 | 6.5 | 6.5 | 6.5 | 6.5 |
| | | | Carboxylic acid 3 | C3 | | — | 554 | — | — | 3.5 | 3.5 | 3.5 | 3.5 | 3.5 | 3.5 |
| | | D | Amine 1 | D1 | | — | — | — | 747 | 11.0 | 11.0 | 11.0 | 11.0 | 11.0 | 11.0 |
| | | | Amine 2 | D2 | | — | — | — | 284 | 6.5 | 6.5 | 6.5 | 6.5 | 6.5 | 6.5 |
| | | | Benzotriazole | | | | | | | 1.0 | 1.0 | 1.0 | 1.0 | 1.0 | 1.0 |
| | | | Polyoxyethylene monoalkyl ether | | | | | | | 2.0 | 2.0 | 2.0 | 2.0 | 2.0 | 2.0 |
| | | | Polyoxyethylene sorbitan monooleate | | | | | | | — | — | — | — | — | — |
| | | | Water | | | | | | | 31.5 | 31.5 | 21.5 | 26.5 | 31.5 | 21.5 |
| Acid value (component B + component C) | | | | | | | | | | 51 | 51 | 73 | 67 | 67 | 73 |
| Base value (component D) | | | | | | | | | | 101 | 101 | 101 | 101 | 101 | 101 |
| Test conditions | Cutting speed | | | 55 (m/min) | | | | | | — | — | — | — | — | ○ |
| | | | | 80 (m/min) | | | | | | ○ | ○ | ○ | ○ | ○ | — |
| Evaluation results | Undiluted liquid stability | | | | | | | | | ○ | ○ | ○ | ○ | ○ | ○ |
| | Tool life (min) | | | | | | | | | 10.2 | 10.2 | 10.2 | 6.1 | 6.1 | 47 |

C. fatty acid: condensed fatty acid

[Evaluation Results]

As is clear from Table 1, the water-soluble metal-working oil agents falling within the scope of the present invention provided a longer tool life in machining a workpiece made of Ti-6AL-4V, which is a hard-to-work material, as compared with the water-soluble metal-working oil agents of the Comparative Examples. Water-soluble metal-working oil agents containing a component having a characteristic temperature below a target level, and water-soluble metal-working oil agents containing a component having a characteristic temperature satisfying a target level in an amount below the target amount satisfied the target stability in the undiluted state, but did not satisfy the target for tool life.

Water-soluble metal-working oil agents containing the component C or the component D in an amount falling outside the target range did not ensure the target stability in the undiluted state.

The water-soluble metal-working oil agent of Comparative Example 6 provided a tool life of about 47 min, when the cutting speed was 55 m/min, but when the cutting speed was elevated to 80 m/min (about 1.5 times), the tool life was considerably impaired.

In contrast, the water-soluble metal-working oil agents of Examples 2 and 6 exhibited equivalent or more excellent performance in the case of low-speed cutting, as compared with the water-soluble metal-working oil agent of Comparative Example 6, and attained a target tool life even at a cutting speed of 80 m/min. Thus, through selection of the ester compound on the basis of characteristic temperature defined in JIS K2242, and selection of a specific condensed fatty acid, a remarkably prolonged tool life was realized in metal working; i.e., intermittent cutting, of a hard-to-work material at a cutting speed faster than a conventionally employed cutting speed.

The invention claimed is:

1. A water-soluble metal-working oil agent, comprising: water, a component A, a component B, a component C, and a component D, wherein:
   the component A is an ester compound which has a characteristic temperature, as measured in accordance with JIS K2242, of 570° C. or higher and which is contained in the water-soluble metal-working oil agent in an amount of 10 mass % or more with respect to an entire amount of the agent;
   the component B is at least one condensed fatty acid which is selected from the group consisting of a condensed fatty acid (1), produced through dehydration condensation of a hydroxycarboxylic acid, and a condensed fatty acid (2), produced through dehydration condensation of an alcoholic hydroxyl group of the condensed fatty acid (1) with a monovalent carboxylic acid, which has a characteristic temperature, as measured in accordance with JIS K2242, of 650° C. or higher, and which is contained in the water-soluble metal-working oil agent in an amount of 10-25 mass % with respect to the entire amount of the agent;
   the component C is a carboxylic acid which is contained in the water-soluble metal-working oil agent in an amount of 2 mass % or more with respect to the entire amount of the agent; and
   the component D is a basic compound contained in such a neutralization equivalent that at least the component B and component C are neutralized to cancel out a sum of the acid values thereof.

2. The water-soluble metal-working oil according to claim 1, wherein the component A has a characteristic temperature of 650° C. or higher.

3. The water-soluble metal-working oil according to claim 1, wherein the component A is a polyol ester.

4. The water-soluble metal-working oil according to claim 3, wherein the polyol ester is an ester of pentaerythritol with a carboxylic acid.

5. The water-soluble metal-working oil according to claim 1, wherein the component B has an acid value of 60 mgKOH/g or less and a hydroxyl value of 50 mgKOH/g or less.

6. The water-soluble metal-working oil according to claim 1, wherein the component D is an amine compound or an alkali metal compound.

7. The water-soluble metal-working oil according to claim 6, wherein component D is an amine compound, which is at least one of an alkanolamine and an alkylamine.

8. The water-soluble metal-working oil according to claim 1, which further comprises water.

9. A metal-working liquid comprising a water-soluble metal-working oil agent according to claim 1, wherein the agent is diluted by water.

10. A metal-working method, comprising:
    working a metal workpiece with a water-soluble metal-working oil agent comprising:
      a component A, a component B, a component C, and a component D,
      wherein the component A is an ester compound which has a characteristic temperature, as measured in accordance with JIS K2242, of 570° C. or higher and which is contained in the water-soluble metal-working oil agent in an amount of 10 mass % or more with respect to an entire amount of the agent;
      the component B is at least one condensed fatty acid which is selected from the group consisting of a condensed fatty acid (1), produced through dehydration condensation of a hydroxycarboxylic acid, and a condensed fatty acid (2), produced through dehydration condensation of an alcoholic hydroxyl group of the condensed fatty acid (1) with a monovalent carboxylic acid, which has a characteristic temperature, as measured in accordance with JIS K2242, of 650° C. or higher, and which is contained in the water-soluble metal-working oil agent in an amount of 7.5 mass % or more with respect to the entire amount of the agent;
      the component C is a carboxylic acid which is contained in the water-soluble metal-working oil agent in an amount of 2 mass % or more with respect to the entire amount of the agent; and
      the component D is a basic compound contained in such a neutralization equivalent that at least the component B and component C are neutralized to cancel out a sum of the acid values thereof.

11. A metal-working method, comprising working a metal workpiece with a metal-working liquid according to claim 9.

12. The metal-working method according to claim 10, wherein the workpiece is at least one species selected from the group consisting of titanium, titanium alloy, nickel alloy, niobium alloy, tantalum alloy, molybdenum alloy, tungsten alloy, stainless steel, and high-manganese steel.

13. The metal-working method according to claim 10, wherein the working is intermittent cutting.

14. The water-soluble metal-working oil according to claim 1, wherein the component B is a dehydrated condensed ricinoleic acid.

15. The water-soluble metal-working oil according to claim 1, wherein the component B has a characteristic temperature according to JIS K2242 of from 628 to 712° C.

16. The water-soluble metal-working oil according to claim 15, wherein the component C is at least one selected from the group consisting of oleic acid, neodecanoic acid and sebacic acid.

17. The water-soluble metal-working oil according to claim 16, wherein the amine component D is at least one selected from the group consisting of mono-isopropanolamine and methyldicyclohexylamine.

* * * * *